United States Patent [19]

Hollaway et al.

[11] 4,238,530
[45] Dec. 9, 1980

[54] METHOD FOR PRODUCING STRESS-RELIEVED FABRIC

[75] Inventors: Gerald C. Hollaway, Springfield; Paul L. Spivy, Rogersville; Jack Nelson; Wayne C. Fieler, both of Springfield, all of Mo.

[73] Assignee: Dayco Corporation, Dayton, Ohio

[21] Appl. No.: 60,098

[22] Filed: Jul. 24, 1979

[51] Int. Cl.³ .............................................. B05D 3/12
[52] U.S. Cl. .................................. 427/173; 26/96;
427/176; 427/211; 427/290; 427/365;
427/398.2
[58] Field of Search ........... 427/173, 176, 290, 398 A, 427/211, 366, 398.2, 365; 118/34, 69; 26/96

[56] References Cited

U.S. PATENT DOCUMENTS

| 1,133,322 | 3/1915 | Seiberling | 427/398 A X |
| 2,520,699 | 8/1950 | Sowerby et al. | 427/176 X |
| 3,784,427 | 1/1974 | Griffin | 427/176 X |

Primary Examiner—Evan K. Lawrence
Attorney, Agent, or Firm—Reuben Wolk; Charles E. Bricker

[57] ABSTRACT

A continuous, spliceless bias fabric in which the angular displacement between the warp and filling yarns is in the approximate range of 90 to 150 degrees is produced by the steps of cutting a tubular, square-woven fabric at a bias angle of 40–50 degrees to provide a continuous length of fabric, optionally drying the fabric, calendering at least one layer of an elastomeric compound to at least one side of the continuous length of fabric, heating the thus-calendered fabric, stretching the fabric in its width direction to provide a warp to filling angle of about 90–150 degrees, and cooling the stretched fabric.

8 Claims, 8 Drawing Figures

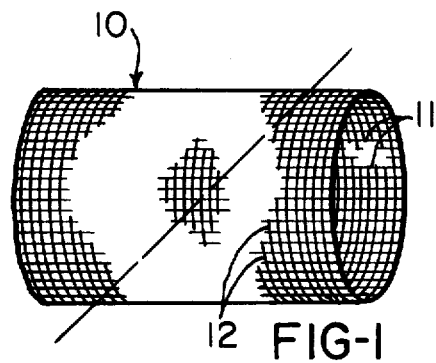
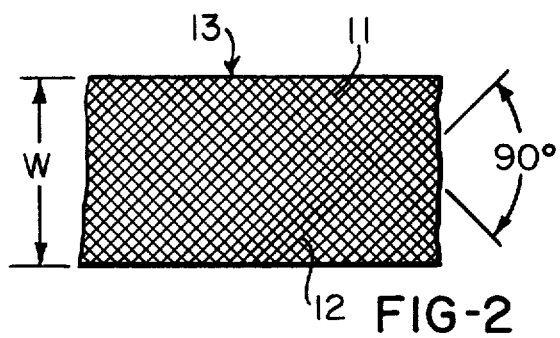
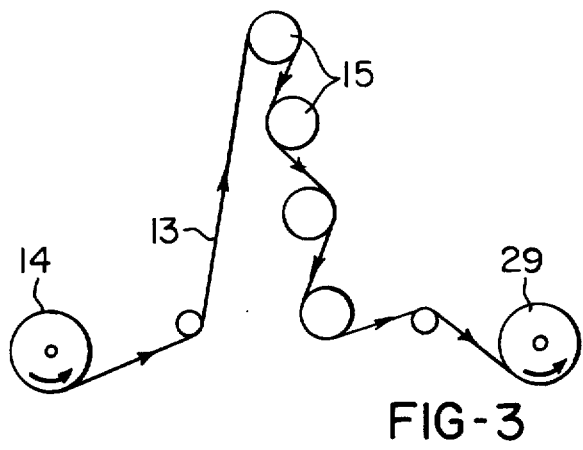
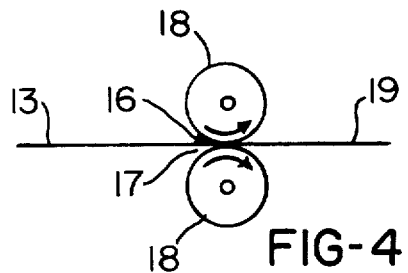
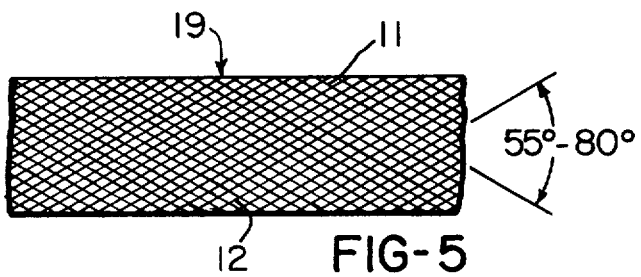
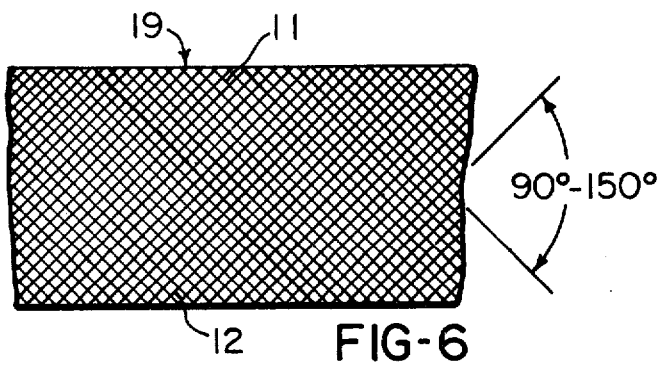

METHOD FOR PRODUCING STRESS-RELIEVED FABRIC

BACKGROUND OF THE INVENTION

This invention relates to a process for making a bias-cut woven fabric.

Many articles of manufacture comprise a bias fabric as a structural reinforcement. Such reinforcement is disclosed, for example, in U.S. Pat. Nos. 2,519,590, 3,478,613, 4,011,766, 4,024,773 and 4,047,446. These patents disclose the use of bias fabric as structural reinforcement for power transmission belts.

The term "bias fabric" comprises a fabric in which both the warp and fill threads are at an angle other than 90 degrees to the longitudinal dimension of the fabric. In the case of power transmission belts, such bias fabric is employed so that the warp and fill threads are at an angle to the longitudinal direction or axis of the belt. The term "bias fabric" comprises square-woven fabric in which the warp and fill threads cross at an angle of about 90 degrees and the so-called "stress-relieved" fabric in which the warp and fill threads cross at an angle greater than 90 degrees and up to about 160 degrees. Bias fabric is generally rubberized with a friction coat, skim coat or otherwise prepared for vulcanization to other rubber or elastomeric materials.

The square-woven bias fabric is generally prepared by calendering an elastomeric compound to a square-woven fabric and cutting the calendered fabric at an angle of about 45 degrees into relatively wide strips. The individual strips are then lap spliced together by overlapping the end of one strip with another using the tacky elastomeric compound as an adhesive, and are then wound up onto the form of a roll. The fabric may, if desired, be slit longitudinally into relatively narrow tapes of desired width and length.

The so-called "stress-relieved" fabric is generally prepared by cutting a continuous strip from a tubular, square-woven fabric using a cutting angle of about 15 degrees. The continuous strip is dried to a predetermined moisture level and elastomeric compound is then calendered thereto. The drying and calendering steps cause the fabric to neck down, i.e., decrease in width, and the angle between the warp and fill threads to increase from about 90 degrees to about 105 degrees. The calendered fabric is cut at an angle of about ¿degrees to the longitudinal dimension of the strip into relatively wide strips. These individual strips are lap spliced together and then wound up into the form of a roll.

The disadvantage of each of the above-described methods for preparing bias fabric is that both methods require the splicing together of individual bias-cut fabric strips. What is desired is a method for producing bias fabric which does not require the splicing together of individual strips.

It has been proposed in U.S. Pat. No. 3,784,427 to produce a bias fabric by cutting a tubular woven fabric into a continuous strip, using a bias cutting angle of between 40 and 50 degrees, coating or impregnating the continuous strip with a binder composition, such as a water-based resorcinol formaldehyde composition or a rubber cement, tensioning the coated or impregnated strip in the widthwise direction to increase the angle between the warp and the filling to an angle about 90 degrees and up to about 160 degrees, and curing the binder composition, thereby stabilizing the warp and filling at the desired thread angle. After curing an elastomeric composition is applied to the strip.

It has now been found that a bias fabric can be produced by a process which is simpler then that described above.

Accordingly, it is an object of the present invention to provide a process for producing a spliceless bias fabric.

Other objects, aspects and advantages of the present invention will be apparent to those skilled in the art from a reading of the following disclosure, the appended claims and the attached drawing.

SUMMARY OF THE INVENTION

In accordance with the present invention there is provided an improved process for making a continuous, spliceless bias fabric in which the angular displacement between the warp and the filling is at least about 90 degrees, and having at least one layer of an elastomeric compound calendered to at least one side thereof. The method of the present invention comprises the steps of cutting a tubular, square-woven fabric at an angle of about 40 to about 50 degrees to provide a continuous length of fabric of width W, optionally drying the fabric to a predetermined moisture level, calendering at least one layer of an elastomeric compound to at least one side of the continuous length of fabric to a temperature sufficient to cause the elastomeric compound to undergo a phase change from the elastic state to the plastic state, heating the thus-calendered fabric, stretching the fabric in its width direction to at least its original width W, and cooling the stretched fabric to a temperature sufficient to cause said elastomeric compound to return from the plastic state to the elastic state.

BRIEF DESCRIPTION OF THE DRAWING

In the drawing,

FIGS. 1 and 2 illustrate the cutting of a continuous length of fabric from a tubular woven fabric;

FIG. 3 illustrates the drying of such fabric;

FIG. 4 illustrates the calendering of an elastomeric compound to one side of such fabric;

FIG. 5 illustrates the fabric after calendering;

FIG. 6 illustrates the fabric after stretching the same in its width direction.

DETAILED DESCRIPTION

Figure 7:
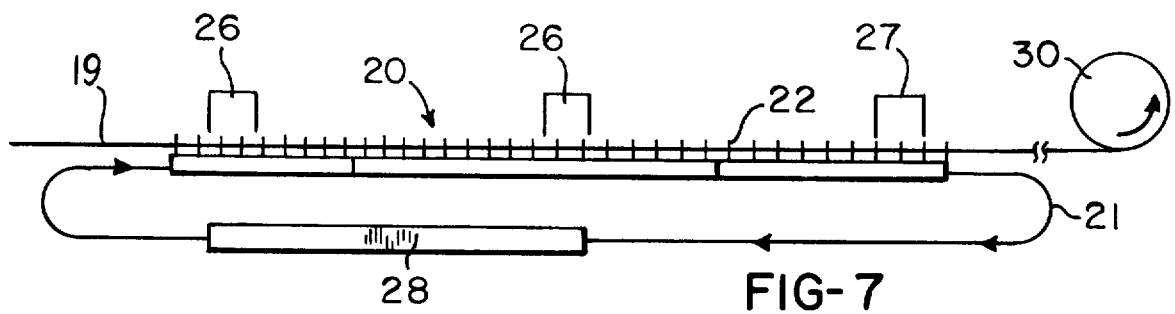
FIGS. 7 and 8 illustrate a tentering apparatus for carrying out the stretching of the fabric in the width direction.

Referring now to the drawing, and as shown in FIGS. 1 and 2, the first step of the process is to bias-cut a tubular woven fabric 10, having a warp 11 and filling 12 into a continuous strip 13 of fabric of width W. The tubular fabric 10 may be woven in any conventional manner with a conventional loom, using threads of any natural or synthetic material, such as cotton, cellulosics, nylon, aramid, polyester and the like and blends and combinations thereof. Conventional equipment may also be used for the cutting operation. Such equipment should be capable of converting a woven tube into a single bias-cut strip. The cutting angle should be about 40 to about 50 degrees, preferably 45 degrees, relative to the longitudinal axis of the tube. The tubular fabric 10 may be, for example, 60 to 170 inches in circumference, and the cutting equipment may be adjusted to cut a strip about 50 to about 120 inches wide (W). As seen in FIG. 2, the warp 11 and the filling 12 in the strip 13 will be in their normal 90 degree relationship as in the initial tube 10, and both sets of threads will lie at approximately 45 degrees relative to the longitudinal edges of the strip 13.

The strip 13 may then be dried to a predetermined moisture level in a conventional manner using, for example, a can-type dryer, as shown in FIG. 3. The fabric strip 13 is passed from a feed roll 14 around a series of heated drums or cans 15 and taken up on a take-up roll 29. During such drying, the strip 13 may decrease in width and in so doing, the angle between the warp 11 and the filling 12 generally decreases to an angle less than 90 degrees.

An elastomeric compound 16 is then calendered onto at least one side of the strip 13 using conventional calendering equipment, as shown in FIG. 4. The strip 13 and the elastomeric compound 16 are simultaneously fed into the nip 17 between oppositely rotating calender rolls 18. The calendered strip, shown in FIG. 5 and now designated 19, having the elastomeric compound on at least one side thereof is shown in FIG. 4, exiting the nip 17.

During the calendering step the strip 13 will decrease in width so that the calendered strip 19 may be only about 75% or less as wide as the strip 13. In so doing, the angle between the warp 11 and the filling 12 decreases to less than 90 degrees, and may decrease to as little as about 55 degrees.

The calendered strip 19 is then tensioned in the widthwise direction, i.e., transverse to the longitudinal direction, to increase the width of the calendered strip to at least the width W of the strip 13 as it was then cut from the woven tube 10. This widthwise tensioning increases the angle between the warp 11 and the filling 12 to at least 90 degrees and such tensioning may be carried out so that this angle is increased to about 150 degrees as shown in FIG. 6. Generally, an angle of about 90 to about 130 degrees is preferred, and an angle in the approximate range of 95 to 115 degrees is more preferred.

Figure 8:
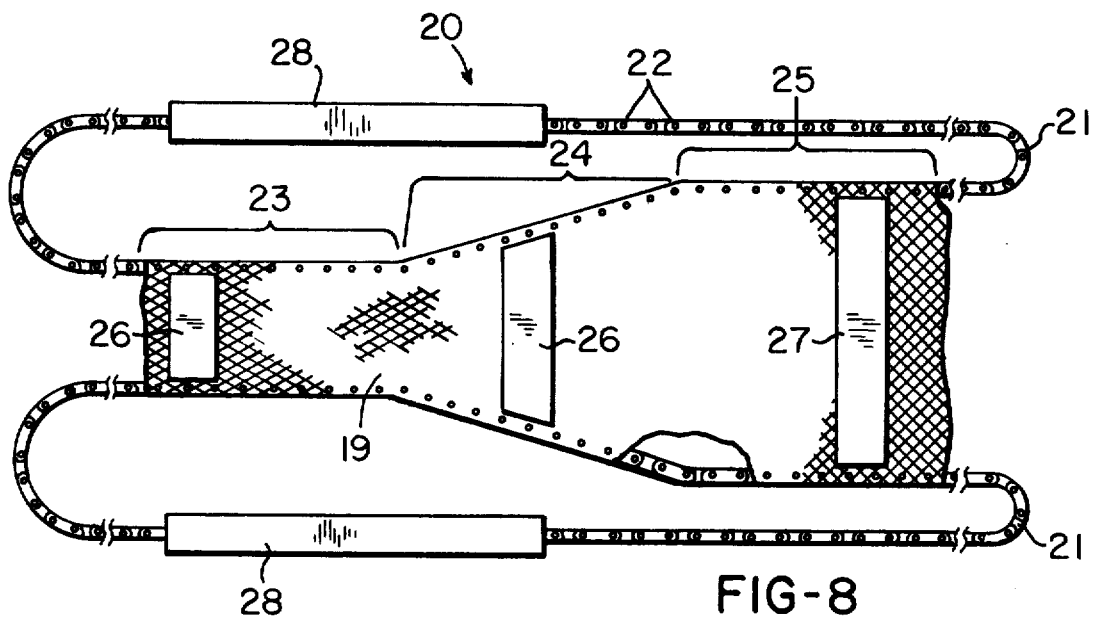

The calendered strip may be tensioned in the widthwise direction using a conventional pin tenter frame, as shown in FIGS. 7 and 8, and designated generally by the numeral 20. As is well known, a pin tenter frame includes a pair of spaced apart driven endless chains 21 each of which carries a series of pins 22 adapted to be attached to one edge of a strip of fabric. The spaced apart chains 21 are disposed to provide three zones in the apparatus. The first of these is the feeding and the mounting zone 23 wherein strip 19 is fed to and mounted onto the pins 22. The chains 21 are parallel and spaced apart in zone 23 at a distance somewhat less than the width of the strip 19. The second zone is the stretching zone 24 wherein the strip 19 is tensioned, i.e., stretched, in the widthwise direction. The chains 21 are disposed in zone 24 at a predetermined diverging angle in the direction of fabric movement in order to impart a predetermined stretch to the strip 19. In the third zone 25, which may be called the cooling zone, the chains 21 are again disposed parallel, but are spaced apart a distance equal to or greater than the original width W of the strip 13.

In order to carry out the tensioning of the calendered strip 19 in the widthwise direction, it is necessary to heat the elastomer to a temperature sufficient to cause it to undergo a phase change, from the elastic state to the plastic state. In general, a temperature in the range of 110 to 200 degrees F. may be employed; however, it will be necessary to determine the proper temperature in actual practice due to variables such as machine design, the elastomeric material employed and the like.

Once the calendered strip is tensioned in the widthwise direction to a desired width and angle between the warp 11 and filling 12, it is necessary to cool the elastomer to a temperature to cause it to return from the plastic state to the elastic state.

The above heating and cooling steps are accomplished by one or more heating means 26 and cooling means 27, respectively, each disposed at predetermined location above the calendered strip 19. The heating means 26 may be hot air heaters, infra-red heaters or the like, and the cooling means 27 may be cool air or the like.

It may be desirable to cool the tenter pin 22 in order to prevent the elastomeric compound from sticking to the pins. The pins 22 may be conveniently cooled by a chiller 28 which is disposed in the return path of the chain 21.

After cooling the strip 19, it is removed from the pins 21 and the strip may be taken up on a take-up means 30, as shown in FIG. 7.

While present exemplary embodiments of the method of this invention have been illustrated and described, it will be recognized that this invention may be otherwise variously embodied into practice within the scope of the following claims.

We claim:

1. A process for making a continuous, spliceless bias fabric in which the angular displacement between the warp and filling yarns is at least about 90 degrees and having at least one layer of an elastomeric compound calendered to at least one side thereof, which comprises the steps of cutting a tubular, square-woven fabric at an angle of about 40 to 50 degrees to provide a continuous strip of said fabric of width W, wherein said warp to filling angle is about 90 degrees; calendering at least one layer of an elastomeric compound onto at least one side of said continuous strip, whereby said fabric decreases in width and said warp to filling angle decreases to less than 90 degrees; heating the resulting calendered strip to a temperature sufficient to cause said elastomeric compound to undergo a phase change from the elastic state to the plastic state tensioning said calendered strip in its width direction to at least said original width W of said continuous strip, thereby increasing said warp to filling angle of said calendered strip to at least 90 and up to about 150 degrees; and cooling the resulting stretched, calendered strip to a temperature sufficient to cause said elastomeric compound to return from the plastic state to the elastic state.

2. The process of claim 1 wherein said calendered strip is tensioned in said width direction to provide an angle between said warp and filling in the approximate range of 90 to 130 degrees.

3. The process of claim 1 wherein said calendered strip is tensioned in said width direction to provide an angle between said warp and said filling in the approximate range of 95 to 115 degrees.

4. The process of claim 1 wherein said tubular fabric is cut into said continuous strip at an angle of about 45 degrees.

5. The process of claim 1 wherein an elastomeric compound is calendered onto one side of said continuous strip.

6. The process of claim 1 wherein an elastomeric compound is calendered onto both sides of said continuous strip.

7. The process of claim 1 wherein said tensioning step is carried out by inserting a plurality of pins into the opposing edges of said calendered strip, and moving said pins apart in said width direction, thereby tensioning said strip in said width direction, wherein said pins are chilled prior to inserting the same into said strip to prevent sticking of the elastomeric compound to the pins.

8. The process of claim 1 additionally comprising the step of drying said continuous fabric strip to a predetermined moisture level following said cutting step and prior to said calendering step.

UNITED STATES PATENT AND TRADEMARK OFFICE
CERTIFICATE OF CORRECTION

PATENT NO. : 4,238,530

DATED : December 9, 1980

INVENTOR(S) : Gerald C. Hollaway et al.

It is certified that error appears in the above—identified patent and that said Letters Patent is hereby corrected as shown below:

Column 1, line 48, "$\int$" should be -- 70 --.

Signed and Sealed this

Fourth Day of August 1981

[SEAL]

Attest:

GERALD J. MOSSINGHOFF

*Attesting Officer*  Commissioner of Patents and Trademarks